Patented Sept. 30, 1952

2,612,519

UNITED STATES PATENT OFFICE 2,612,519

PREPARATION OF ESTERS OF $\alpha,\beta$-DICHLOROPROPIONIC ACID

William O. Ney, Jr., Somerset Center, Mass., assignor to General Aniline & Film Corporation, New York, N. Y., a corporation of Delaware No Drawing. Application December 9, 1950, Serial No. 200,090

4 Claims. (Cl. 260—487)

This invention relates to the preparation of esters of $\alpha,\beta$-dichloropropionic acid by chlorination of the corresponding esters of acrylic acid.

I have found that preparation of $\alpha,\beta$-dichloropropionic acid esters by passing chlorine into the corresponding acrylic ester, is complicated by side reactions resulting in the formation of dimers and other high-boiling byproducts which prevent the recovery of the desired $\alpha,\beta$-dichloropropionic ester in satisfactory yields. The reaction is quite highly exothermic so that temperature control is difficult. If the temperature is allowed to rise spontaneously, very little $\alpha,\beta$-dichloropropionic ester is produced.

The preparation of esters of $\alpha,\beta$-dichloropropionic acid by chlorination of the corresponding esters of acrylic acid was carried out heretofore in the presence of a solvent such as chloroform (U. S. Patent 2,320,034) or methanol (J. A. C. S. 62, pages 3495-3498). Separation of the reaction product from solvents such as chloroform or methanol is inconvenient and costly. Moreover, upon preparing methyl $\alpha,\beta$-dichloropropionate in methanol according to the directions in J. A. C. S. 62, page 3495, I was unable to obtain a product of satisfactory purity by fractional distillation of the reaction mixture. Namely, the fraction having the proper boiling range had an index of refraction ($n_D^{25}$) of 1.4493, while methyl $\alpha,\beta$-dichloropropionate has an index of refraction of 1.45108.

It has also been proposed to chlorinate methyl acrylate at 0° C., employing bromine as a catalyst (U. S. Patent 2,195,712). Repetition of this procedure and fractional distillation of the product to recover methyl $\alpha,\beta$-dichloropropionate yielded a fraction having a refractive index approximating that of the pure ester, but in a yield of only 10% of theory.

Chlorinating methyl acrylate with gaseous chlorine in the presence of polymerization inhibitors, chlorine addition catalysts such as iodine, bromine or mercuric sulfate, and maintaining low temperatures, sometimes produces somewhat higher yields, but the results are unreliable and the yields obtained are not of sufficient magnitude to render the process of interest for commercial operations.

It is an object of this invention to provide an improved process for the preparation of esters of $\alpha,\beta$-dichloropropionic acid by chlorination of the corresponding acrylic esters, wherein high yields of pure product can be obtained in a reliable and efficient manner.

I have discovered that esters of $\alpha,\beta$-dichloropropionic acid can be produced in relatively high yields from the corresponding acrylic esters by treatment with chlorine in the presence of a quantity of water amounting to 1 to 8% of the weight of the acrylic ester initially employed. When water is added in these amounts, the chlorination can be carried out at temperatures from −10 to 80° C. without substantial variation in the yield obtained. The presence, in addition to water, of chlorine addition catalysts such as iodine, bromine or mercuric salts, produces no substantial improvement in yield, and in some cases causes slight lowering of the yield. Polymerization inhibitors are advantageously employed to prevent polymerization of the acrylic ester used as the starting material. However, except for this effect, they too have no substantial effect upon the yield of $\alpha,\beta$-dichloropropionate when water is present in the amount specified above. Irradiation of the reaction mixture with diffused daylight has been found to have no substantial effect on the yield, and accordingly, it is immaterial whether the reaction mixture is protected from, or exposed to, such radiation.

The process in accordance with my invention thus involves passing chlorine into a liquid ester of acrylic acid mixed with 1 to 8% of its weight of water. The temperature is preferably maintained at 0 to 40° C., but can be permitted to rise as high as 80° C. without adverse effect upon the reaction. Temperatures below 0° C. can likewise be employed, but are generally unnecessary. I have found, for example, that maintenance of temperatures from −35 to 0° C. does not materially increase the yield of the desired esters.

The esters of acrylic acid which can be chlorinated in accordance with this invention are esters of saturated aliphatic, cycloaliphatic and araliphatic alcohols such as, for example, the acrylic acid esters of methanol, ethanol, propanol, isopropanol, butanol, pentanol, isoamyl alcohol, octyl, decyl, lauryl, palmityl and stearyl alcohols, cyclohexanol, methyl cyclohexanol and benzyl alcohol. In addition, acrylic esters of saturated polyhydric alcohols such as glycol, glycerol, 1,4-butanediol and the like can be similarly chlorinated.

The process in accordance with my invention is illustrated in the following examples, wherein parts and percentages are by weight.

EXAMPLE 1

35.4 parts of methyl acrylate containing 0.25% hydroquinone as a polymerization inhibitor, and 2.8 parts of water were agitated in a glass reaction vessel shaded from light, and cooled with a solid $CO_2$-acetone bath, and chlorine gas was bubbled into the liquid ester at such a rate as to maintain the temperature at about 40° C. After 4 hours, unabsorbed chlorine was observed condensing in the exhaust gas condenser cooled with solid $CO_2$, and no further cooling was required to maintain the temperature of the reaction mixture at 40° C. The reaction mixture was neutralized with calcium carbonate until no further evolution of $CO_2$ occurred, or with aqueous sodium carbonate until the pH of the mixture was 4 to 5. The reaction mixture was then subjected to steam distillation. The organic nonaqueous portion of the distillate was separated from the aqueous condensate and fractionally distilled at an absolute pressure of 10 mm. of mercury. A low boiling fraction collected at 45 to 58° C. had a lower index of refraction than methyl $\alpha,\beta$-dichloropropionate. The principal fraction distilled at 58 to 60° C. at the aforesaid pressure, and had an index of refraction $(n_D^{25})$ of 1.4503 to 1.4505. It was substantially pure methyl $\alpha,\beta$-dichloropropionate. 26.4 parts thereof were recovered, corresponding to a yield of 41% of theory, based on the methyl acrylate initially employed.

EXAMPLE 2

100 parts of freshly distilled methyl acrylate containing 1.5% of its weight of water was chlorinated in a vessel equipped with a reflux condenser, by passing chlorine into the mixture as fast as absorption could occur. The temperature rose rapidly to the boiling point of methyl acrylate (80 to 81° C.) and the condensed methyl acrylate vapor was refluxed to the reaction mixture. When no further chlorine absorption occurred, the reaction mixture was allowed to cool and fractionally distilled under reduced pressure. 95 parts of methyl $\alpha,\beta$-dichloropropionate were thus recovered, having a boiling point of 65° C. at an absolute pressure of 15 mm. of mercury, and an index of refraction $(n_D^{20})$ of 1.4510. The yield of methyl $\alpha,\beta$-dichloropropionate was 52% of theory.

EXAMPLE 3

Gaseous chlorine was passed into pure methyl acrylate containing 0.25% of its weight of hydroquinone and 2% of its weight of water. The reaction temperature was maintained at 35 to 40° C. by cooling with an ice bath. When chlorine absorption was substantially complete, the reaction mixture was fractionally distilled under reduced pressure. Methyl $\alpha,\beta$-dichloropropionate was recovered in a yield amounting to 41% of theory.

EXAMPLE 4

A mixture was prepared consisting of methyl acrylate containing 0.25% of its weight of hydroquinone and 1% of its weight of an aqueous mercuric sulfate solution prepared by dissolving 3.0 parts of mercuric sulfate and 2.8 parts of sulfuric acid in 40 parts of water. Chlorine was bubbled through the reaction mixture while maintaining the temperature at −10° C. until chlorine absorption was substantially complete. Upon fractional distillation of the resulting reaction mixture, methyl $\alpha,\beta$-dichloropropionate was recovered in a yield of 37% of theory.

EXAMPLE 5

To 100 parts of cyclohexylacrylate were added 10 parts of hydroquinone, 3 parts of water and 1 part of bromine to serve as a chlorination accelerator. Chlorine was passed into the liquid mixture while maintaining the temperature at 30 to 40° C. When chlorine absorption was complete, the reaction product was dried over anhydrous sodium sulfate, and fractionally distilled under reduced pressure. Cyclohexyl $\alpha,\beta$-dichloropropionate was recovered as a fraction boiling at 107° C. at 4 mm. of mercury absolute pressure, in a yield comparable with those obtained in the foregoing examples.

As a comparison with the foregoing examples, methyl acrylate was chlorinated in the absence of water at different temperatures and with various additions of catalysts and polymerization inhibitors, and methyl $\alpha,\beta$-dichloropropionate was separated from the resulting reaction mixture. The temperature, added material, and yield in terms of per cent of theory are given in the following table.

*Table*

| Temperature | | Polymerization Inhibitor | Chlorine Addition Catalyst | Yield |
| --- | --- | --- | --- | --- |
| Control | Value | | | |
| | | | | *Percent* |
| Reflux | (ca. 80–135°) | None | None | 5 |
| Reflux+heating | 80 to 162° | do | do | 14 |
| Reflux | (ca. 80–135°) | 0.3% picric acid | do | 11 |
| Do | (ca. 80–135°) | 1.32% picric acid | do | 14 |
| Cooling | −10 to 0° C. | do | do | 19 |
| Reflux | (ca. 80–135°) | 0.25% hydroquinone | do | 16 |
| Do | (ca. 80–135°) | 1.25% hydroquinone | do | 11 |
| Cooling | −35 to 0° C. | do | do | 11 |
| Do | 0° C. | 0.25% hydroquinone | 1.8% $Br_2$ | 10 |
| Do | −35° C. | 1% tert. butyl catechol | 0.1% $I_2$ | 21 |
| Do | −10° C. | do | 0.1% $I_2$ | 11 |

The results set out in the foregoing table show that poor and unreliable yields are obtained when chlorination is carried out in the absence of water, whereas, as shown by the examples, the yields of 37 to 52% methyl $\alpha,\beta$-dichloropropionate were obtained by including water in the reaction mixture in accordance with this invention.

Instead of the esters employed in the examples, other esters of acrylic acid, as enumerated in the discussion preceding the examples, can be similarly converted to the corresponding $\alpha,\beta$-dichloropropionic esters with high yields.

In carrying out the reaction, chlorine is advantageously introduced in gaseous form until absorption substantially ceases, as indicated by an absence of the tendency of the temperature to rise despite discontinuance of cooling, and by the passage of most of the chlorine through the liquid reaction mixture without absorption. The presence of polymerization inhibitors such as tertiary butyl catechol, hydroquinone or picric acid in amounts from 0.1 to 1.5% is advantageous to prevent polymerization of the acrylic esters undergoing treatment in the reaction mixture. Chlorine addition catalysts are of no substantial advantage and are preferably omitted. The temperature is advantageously maintained at 0 to 40° C. for uniformity of control, although temperatures from —10° to 80° C. can be used without substantial disadvantage. The reaction product can be recovered from the mixture by fractional distillation under reduced pressure. If desired, steam distillation may precede the final fractional distillation. Fractions boiling at higher temperatures than the $\alpha,\beta$-dichloropropionic ester are generally found to contain chlorinated dimers and chlorinated higher polymers of the acrylic ester.

Variations and modifications which will be obvious to those skilled in the art can be made in the procedures hereinbefore described, without departing from the scope or spirit of the invention.

I claim:

1. A process for the preparation of an ester of $\alpha,\beta$-dichloropropionic acid, which comprises passing chlorine into a liquid acrylic acid ester of an alcohol of the class consisting of saturated aliphatic, cycloaliphatic, and araliphatic alcohols, containing from 1 to 8% of its weight of water.

2. A process for the preparation of an ester of $\alpha,\beta$-dichloropropionic acid, which comprises passing chlorine into a liquid acrylic acid ester of an alcohol of the class consisting of saturated aliphatic, cycloaliphatic, and araliphatic alcohols, containing from 1 to 8% of its weight of water, at a temperature of —10 to 80° C.

3. A process for the preparation of an ester of $\alpha,\beta$-dichloropropionic acid, which comprises passing chlorine into a liquid acrylic acid ester of an alcohol of the class consisting of saturated aliphatic, cycloaliphatic, and araliphatic alcohols, containing from 1 to 8% of its weight of water, at a temperature of 0 to 40° C. until chlorine absorption is substantially complete, and recovering the $\alpha,\beta$-dichloropropionic acid ester from the reaction mixture.

4. A process for the preparation of methyl $\alpha,\beta$-dichloropropionate, which comprises passing chlorine into liquid methyl acrylate containing 1 to 8% of its weight of water at a temperature from —10 to 80° C., and recovering $\alpha,\beta$-dichloropropionate from the reaction products by fractional distillation.

WILLIAM O. NEY, Jr.

No references cited.